United States Patent [19]

Hunter et al.

[11] Patent Number: 4,556,484
[45] Date of Patent: Dec. 3, 1985

[54] WATER FILTERS

[75] Inventors: Charles L. Hunter, Loveland; Payton D. Fuller; David K. Mutchler, both of Ft. Collins, all of Colo.

[73] Assignee: Teledyne Industries, Inc., Fort Collins, Colo.

[21] Appl. No.: 510,979

[22] Filed: Jul. 5, 1983

[51] Int. Cl.[4] .......................................... B01D 35/02
[52] U.S. Cl. ................................... 210/90; 210/133; 210/135; 210/240; 210/416.3; 210/424; 210/443; 210/456; 210/459; 137/798
[58] Field of Search ............... 210/741, 807, 808, 87, 210/90, 91, 94, 130, 133, 240, 249, 416.1, 416.3, 422, 423, 424, 429, 430, 431, 432, 440, 444, 456, 501, 900, 916, 917, 135, 238, 282, 449, 460, 443, 459; 137/798, 801

[56] References Cited

U.S. PATENT DOCUMENTS

| | | | |
|---|---|---|---|
| 1,508,056 | 9/1924 | Jansen | 137/798 |
| 2,407,190 | 9/1946 | Tait | 210/416.1 |
| 2,473,986 | 6/1949 | Booth | 210/416.3 |
| 3,080,972 | 3/1963 | Smith | 210/133 |
| 3,144,878 | 8/1964 | Williams | 137/801 |
| 3,366,143 | 1/1968 | Bauer | 137/798 |
| 3,486,622 | 12/1969 | Rosaen et al. | 210/91 |
| 3,853,761 | 12/1974 | McClory | 210/449 |
| 3,967,638 | 7/1976 | Tondreau | 210/449 |
| 4,107,046 | 8/1978 | Corder | 210/460 |
| 4,456,222 | 6/1984 | Shen | 137/801 |

*Primary Examiner*—Richard V. Fisher
*Assistant Examiner*—Wanda L. Millard
*Attorney, Agent, or Firm*—Hugh H. Drake

[57] ABSTRACT

A water filter connects into a waterline which feeds a faucet separate from the filter. A filter cartridge is seated within a canister and has an inlet and an outlet. The canister is removably attached to a cap in which is disposed an entrance port to communicate with the outlet and an exit port to communicate with the inlet. Also in the cap are an input port for receiving water from the line, an output port for delivering water into the line to feed the faucet, a passage which communicates between the input port and the exit port, a passageway which communicates between the input port and the output port and a channel which communicates between the entrance port and the output port. A diverter in the cap responds to a rate of water flow from the faucet of less than a predetermined amount for opening the passage and the channel and closing the passageway, while being responsive to a rate of flow greater than such amount for closing the passage and the channel but opening the passageway. A selector at the faucet is manually adjustable to determine which rate of flow occurs, that selection making the determination of whether the water delivered to the faucet has been filtered or has bypassed the filter. Alternative coupling arrangements permit the water filter to be readily connected into an existing water line of essentially any orientation by cutting that line at only one point.

37 Claims, 15 Drawing Figures

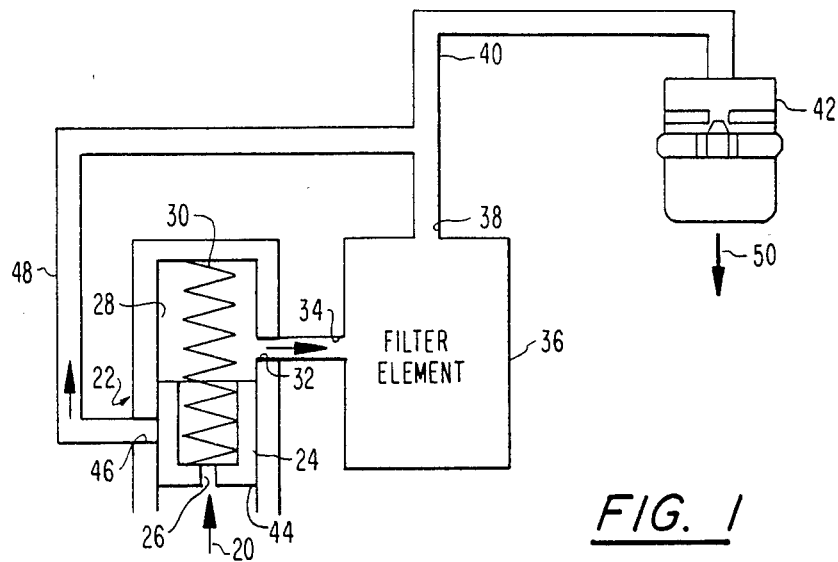
FIG. 1
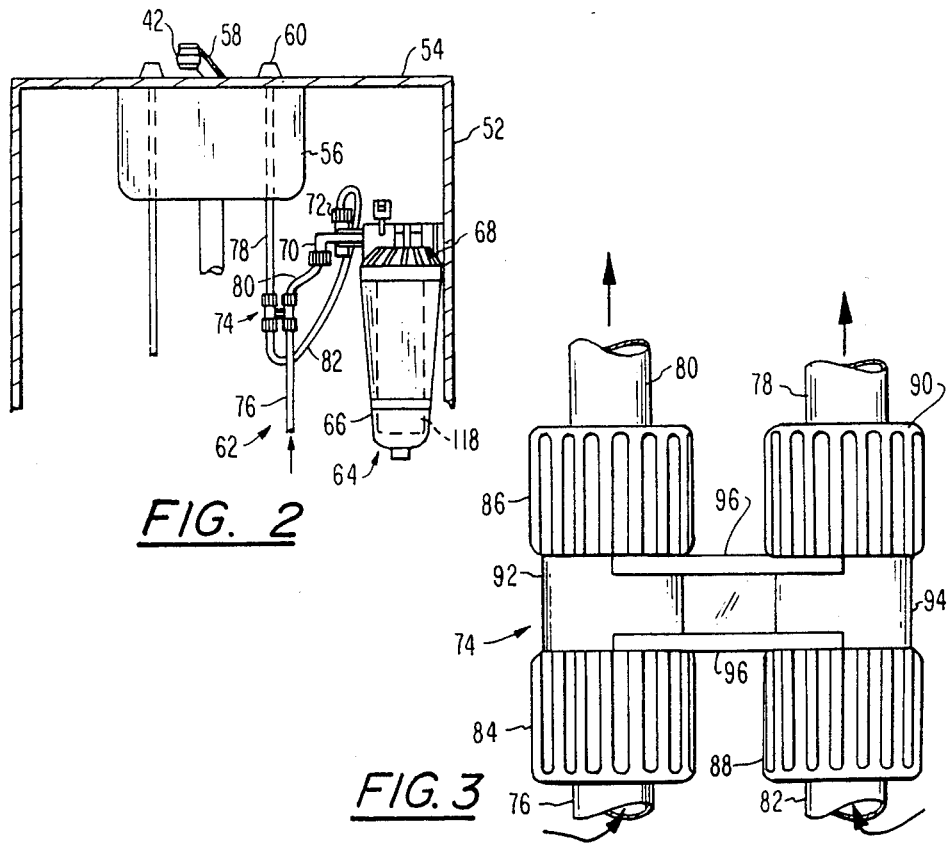
FIG. 2
FIG. 3

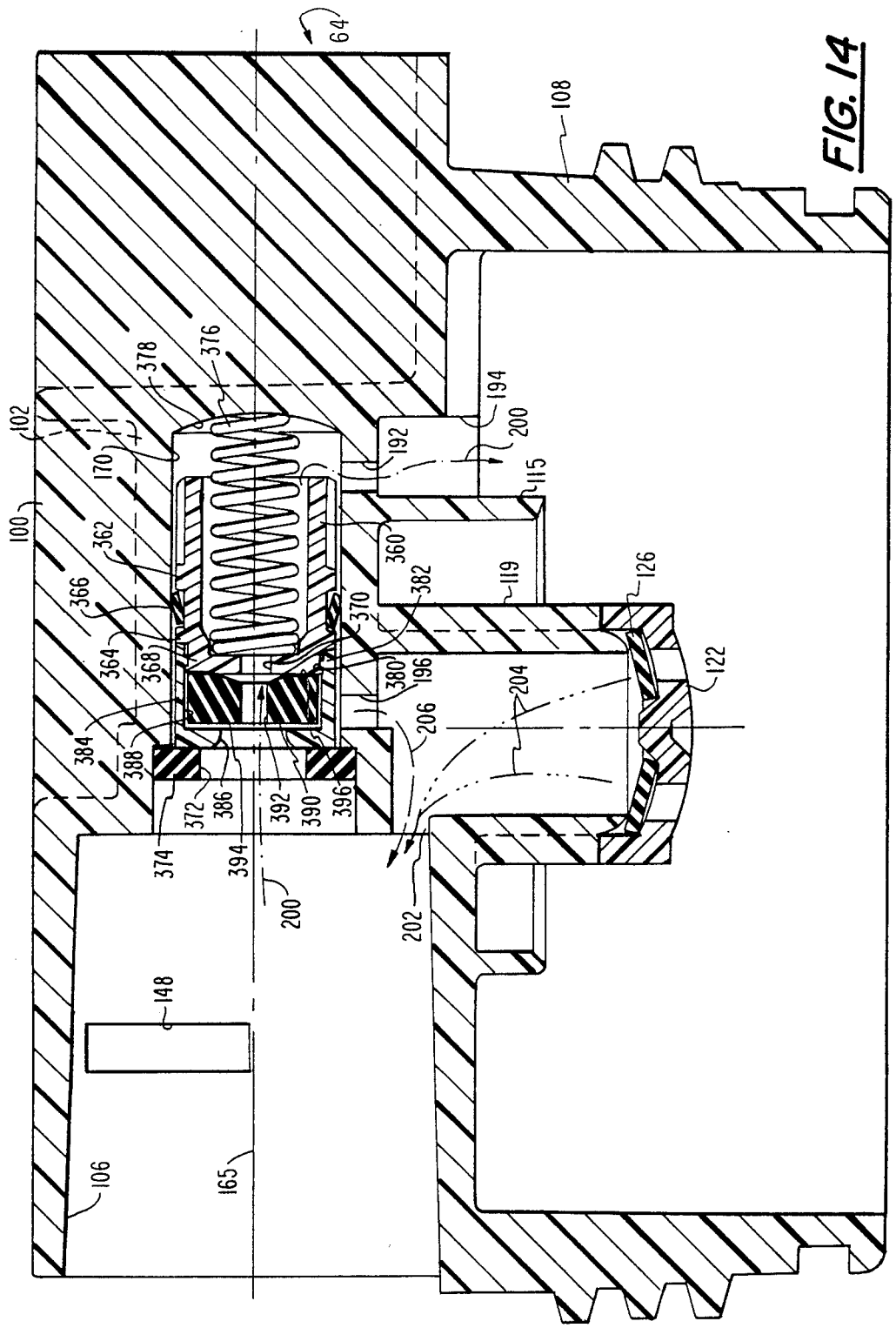

WATER FILTERS

The present invention pertains to water filters. More particularly, it relates to water filters which may be controlled as between delivering filtered and unfiltered water from a remote location.

Many different water filters have been known for the purpose of removing impurities from water being delivered. In some instances, especially for household use, a selector has been included for the purpose of bypassing the filter when unfiltered water is satisfactory, such as for washing dishes. Filtered water is selected only when desired for such purposes as drinking. By-passing the filter element for water usages which do not require filtering serves greatly to conserve the life of the filter element, because such usages typically are copious in amount compared to use of water for human consumptive purposes.

Some prior water filters have been designed to mount, for example, on the kitchen countertop. Those are supplied with water from the incoming water line and usually have their own faucet for the delivery of filtered water. Unfiltered water is obtained in the normal way from the regular faucet. Other approaches have placed the water filter in association either with the sink faucet or with a vegetable spray or the like. Those have included a selector and a dual outlet arrangement, so that the user has a choice of filtered or unfiltered water.

Water filters of a larger size have been arranged for mounting in a location such as in a cabinet under the kitchen sink. Often, such under-sink water filters have included a selector built into the filter unit and having a control operable at the unit for selecting as between the delivery of filtered and unfiltered water on to the sink faucet. Typically, those units, like the others, use a replaceable cartridge as the actual filtering element. By taking advantage of the space beneath the sink, a unit which accepts a much larger cartridge may be employed, so as to extend the life of the element between changes and to allow for more complete purification of organic matter.

Such under-sink water filters have to be connected into the water line which supplies cold water to the sink faucet. In many cases, the coupling into the water line has required the services of a plumber and the task of installation is sufficiently involved that several hours may be required at a corresponding substantial charge. In some cases, it has been necessary to significantly modify the existing plumbing.

Another disadvantage of prior under-sink water filters has been that the selector is removed from sight, so that the user may forget to cause the unit to bypass the filter element when filtered water is not needed or to remind the user that the filter is in the bypass mode and ought to be changed into the filter mode. In any case, the user must stoop down and peer into the cabinet in order to determine the mode setting, a determination which also requires that the region in front of the water filter be kept free of obstacles to vision.

It is, accordingly, a general object of the present invention to provide a water filter which is an improvement upon and overcomes deficiencies and disadvantages of prior water filters such as those discussed above.

Another object of the present invention is to provide a large-capacity water filter, in terms of life of the filter element, which may be placed beneath a sink in a location where it is most out of the way, a position which may be behind other items typically stored under a sink such as a waste basket, soaps and so forth.

A further object of the present invention is to provide a new and improved water filter combination which permits selection of its mode of operation at a location above the sink as well as to provide a visual indication at that location of the mode which has been selected.

Still another object of the present invention is to provide a water filter combination which is comparatively simple and easy to install and connect into an existing water line.

A still further object of the present invention is to provide an under-sink water filter of the replaceable cartridge type which permits easy replacement of the cartridge without the spilling of water.

It is still another object of the present invention to provide a cartridge-type water filter which is capable of accepting a variety of different cartridges presently available on the market.

A related object of the present invention is to provide a water filter which attains the foregoing objectives while retaining several advantageous features of some prior water filters, including the provision of a visual indication of a need for cartridge replacement and the capability of not only removing particulates and offensive tastes and odors but also purifying organic impurities.

A water filter unit constucted in accordance with one embodiment of the present invention is intended for connection into a water line which feeds a valve-controlled faucet separate from the filter unit. The unit includes a canister in which a filter cartridge, having an inlet and an outlet, is seated. The canister is removably attached to a cap. Within the cap is an entrance port disposed to communicate with the filter outlet and an exit port disposed to communicate with the filter inlet. Also within the cap is an input port for receiving water from the water line and an outlet port for delivering water into the line in order to feed the faucet. Further defined within the cap are a passage which communicates between the input and exit ports, a passageway communicating between the input and output ports and a channel that communicates between the entrance port and the output port. A diverter located in the cap responds to a rate of water flow from the faucet of less than a predetermined amount by opening the passage and the channel and closing the passageway. The diverter, on the other hand, responds to a rate of water flow from the faucet of more than the predetermined amount by closing the passage and the channel and opening the passageway.

A further feature of the water filter as specifically embodied involves the inclusion of a faucet that is adjustable between a first position wherein the flow rate is less than the aforementioned predetermined amount and a second position in which the flow rate is above that amount. Still another feature which may be included relates to a coupling assembly that has an entrance fitting, an outlet fitting, an inlet fitting and an exit fitting. A first channelway within that assembly communicates between the entrance fitting and the outlet fitting, while a second channelway communicates between the inlet fitting and the exit fitting. A downstream end of the water line is coupled to the entrance fitting and an upstream end of the water line is coupled to the exit fitting. A first pipe is coupled between the outlet fitting and the input port and a second pipe is coupled between the output port and the inlet fitting.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which;

FIG. 1 is a schematic diagram of a water filter combination in accordance with one embodiment of the present invention;

FIG. 2 is a front elevational view illustrating a typical installation of the combination of FIG. 1;

FIG. 3 is a front elevational view of a coupling assembly employed to connect the water filter unit into an existing water line;

FIG. 4a is an enlargement of a portion of FIG. 4 as indicated by the circle 4a;

FIG. 14 is a cross-sectional view similar to a portion of FIG. 4 but of an alternative embodiment of that portion.

Figure 4:
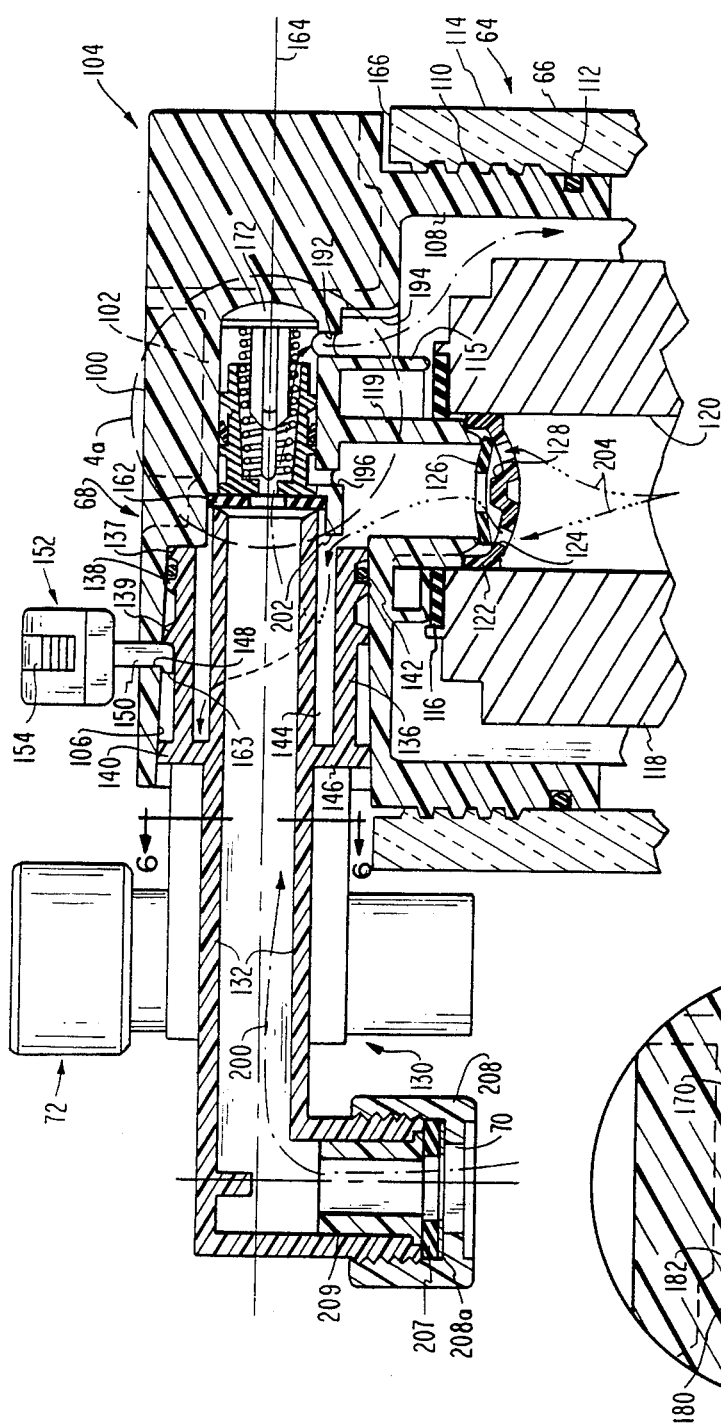
FIG. 4 is a fragmentary cross-sectional view taken centrally through a water filter unit.
Figure 4A:
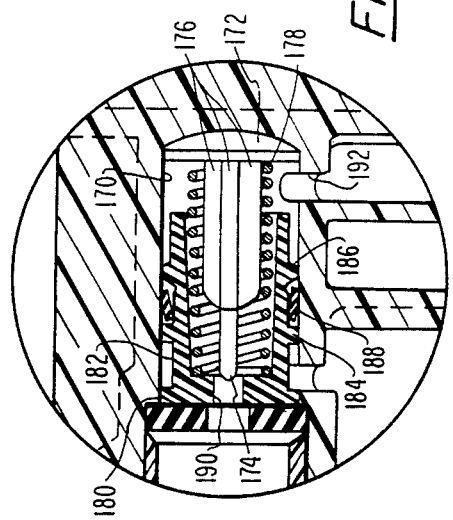

In FIG. 1, water from a line, indicated by an arrow 20, is fed into a diverter 22 which includes a piston 24 having an entrance 26 through which the water is admitted. Piston 24 is slideable within a bore 28 and is urged toward the position illustrated by a compression spring 30. An exit port 32 from bore 28 feeds water which enters through port 26 into an inlet 34 of a filter element 36. After being filtered, the water leaves by way of an outlet 38 and flows through a conduit 40 into a flow selector 42. When piston 24 is moved upwardly in FIG. 1 by the force of incoming water upon its face 44, port 32 is closed and a port 46 is opened to permit the passage of incoming water through a conduit 48 and on through conduit 40 to selector 42.

Within selector 42 are two primary flow paths. When only one is opened, the rate of flow out of selector 42, along the path indicated by arrow 50, is below a predetermined amount such that spring 30 holds piston 24 in the position illustrated wherein port 46 is closed and port 32 is opened. Thus, the water delivered through selector 42 is filtered by element 36. When, however, selector 42 is adjusted to a different position, both flow paths within the selector are open to permit a rate of flow out of selector 42 greater than the aforementioned predetermined amount. Spring 30 is so calibrated that, under this condition of operation, the increasing flow of water impinging against face 44 urges piston 24 upwardly to a position in which port 32 is closed by the piston and port 46 is opened. In that mode of operation, all water flows by way of conduit 48 into conduit 40 and through selector 42, and filter element 36 is bypassed.

FIG. 2 illustrates a sink cabinet 52 having a countertop 54 into which is mounted a sink 56. Projecting upwardly and over sink 56 is a faucet 58 under the control of a valve 60 to deliver water incoming from a water line 62. Mounted on the other end of faucet 58 is selector 42 mentioned in connection with FIG. 1. Mounted within cabinet 52 is a filter unit 64 which includes a canister 66 within which a filter cartridge is mounted and which is removably attached to a cap 68. Cap 68 has an input port 70 and an output port 72. Canister 66 and cap 68 together form a housing for the filter cartridge.

Connected into water line 62 is a coupling assembly 74 disposed between an upstream portion 76 and a downstream portion 78 of line 62. A pipe 80 conducts water from coupling assembly 74 into input port 70, while a pipe 82 conducts water from output port 72 back into coupling assembly 74. The water in pipe 80 is derived through the coupling assembly from upstream portion 76, while the water delivered upwardly through portion 78 comes through assembly 74 from pipe 82. When selector 42 is adjusted into a first position, the water delivered from output port 72 has gone through the filter cartridge within canister 66. On the other hand, when selector 42 is adjusted to a second position, the water delivered upwardly through pipe portion 78 has bypassed the filter cartridge.

In a different mode of installation, pipe portion 78 is coupled directly into output port 72 and pipe portion 76 is coupled directly into input port 70. Again with that approach, pipe 62 need only be cut, as with a hacksaw, in a single place after which the two portions 76 and 78 are fitted into and sealingly clamped into place within respective ones of ports 70 and 72. That approach necessarily requires that filter unit 64 be located adjacent to line 62.

The inclusion of coupling assembly 74 and pipes 80 and 82 enables filter unit 64 to be located within cabinet 52 at whatever location is most convenient. As illustrated in FIG. 2, pipes 80 and 82 are flexible copper tubing which can be bent easily with care and sufficiently to enable those pipes to be routed along convenient paths.

Coupling assembly 74 is more readily viewed in the enlarged representation of FIG. 3. It includes an entrance fitting 84, an outlet fitting 86, an inlet fitting 88 and an exit fitting 90. A conduit 92 defines a channelway for communication between fittings 84 and 86, while a conduit 94 defines a channelway for communication between fittings 88 and 90. Struts 96 rigidly connect conduit 92 to conduit 94 so as to form a unitary assembly. Each of fittings 84–90 includes a nut threaded upon the corresponding end of its respective conduit and internally includes a resilient washer. The water line end to be connected is inserted within the nut and through the sealing washer. When the nut is tightened upon the conduit, the interior diameter of the sealing washer decreases sufficiently to tightly clamp the end portion of the line in place. A preferred form of nut and sealing combination is shown and will be discussed in more detail in connection with the discussion of input port 70 as depicted in FIG. 4.

To install coupling assembly 74, water line 62 is severed in a single place after which entrance fitting 84 is slipped over the upwardly facing end of upstream portion 76 and the downwardly projecting end of downstram portion 78 is slipped into exit fitting 90. With water line 62 being fabricated of copper tubing as is typical in most buildings today, portions 76 and 78 are sufficiently flexible to be moved laterally the necessary distance to accommodate the small lateral spacing between the respective fittings. The corresponding end portions of pipes 80 and 82 are similarly inserted into respective fittings 86 and 88, after which all fittings are tightened down to complete both the mechanical clamping of the pipes and line portions while at the same time forming water-tight seals. As also will be further discussed with regard to FIG. 4, adapter sleeves insertable within the different fittings enable the accommodate of several different pipe or line sizes.

Figure 5:
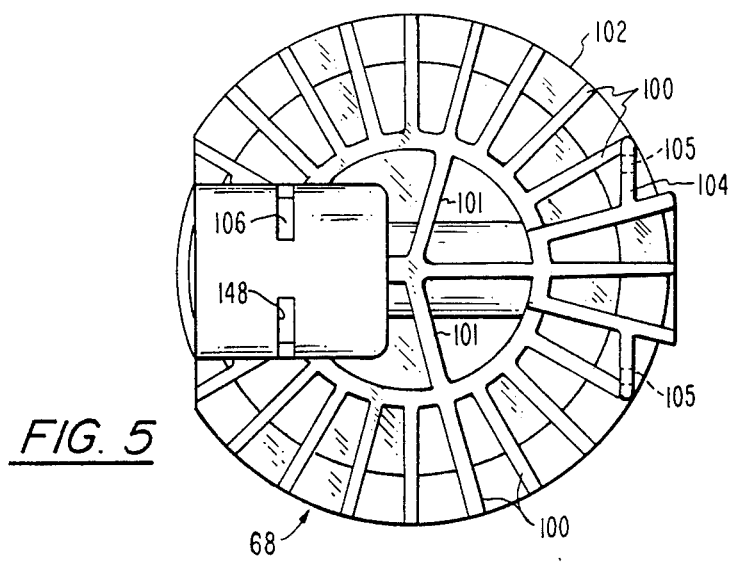
FIG. 5 is a reduced top plan view of a component shown in FIG. 4.
Figure 9:
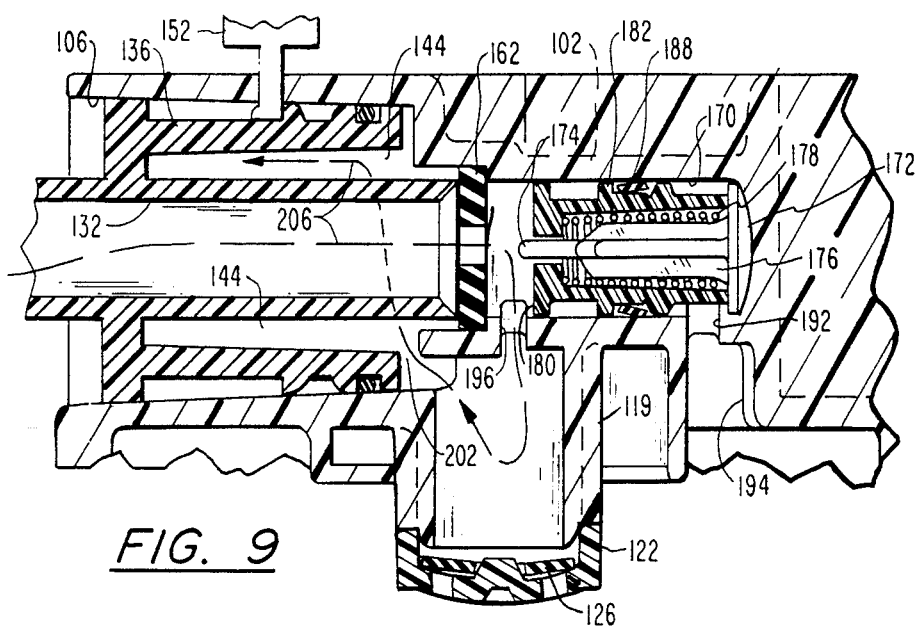
FIG. 9 is an enlarged fragmentary view of a portion of FIG. 4 but with certain of the parts in a different position and depicting a different water flow path arrangement.

The construction of cap 68 is best revealed in FIGS. 4, 5 and 9. To accommodate numbering, not all parts numbered in FIG. 4 are numbered in FIG. 9 and vice versa. In this case, cap 68 is plastic so molded as to create a plurality of different internal open spaces the purposes of which will be explained further. As can be seen in FIG. 5, its upper surface is formed to create a plurality of strengthening ribs 100 and 101 which project upwardly from a body 102. Facing outwardly from one portion of the top of the cap is an integral bracket 104 through which are formed a pair of holes 105 to enable mounting cap 68 to a wall of cabinet 52 or other surface.

Opening outwardly on the other side of cap 68 from bracket 104 is a cavity 106 the diameter of which increases with a slight taper in the outward direction. Depending downwardly from cap 68 is a circular flange 108 upon which canister 66 is removably threaded as indicated at 110. Around the circumference of flange 108 is a groove in which is seated an O-ring 112 to insure a seal between flange 108 and the upper portion 114 of canister 66. Also depending downwardly from cap 68 is a cylindrical wall 115 the lower periphery of which, in use, engages a seal 116 affixed on the upper end of a filter cartridge 118 that projects downwardly and centrally.

Figure 8:
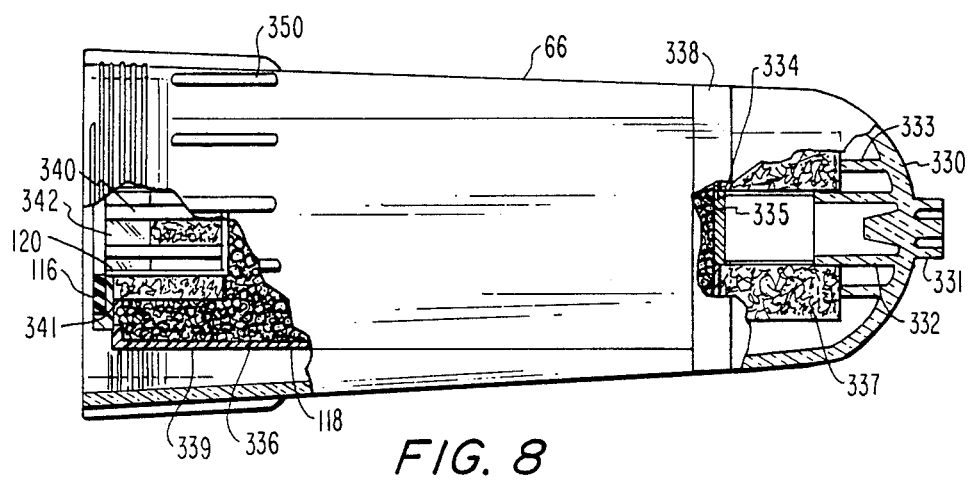
FIG. 8 is a reduced side elevational view, partially broken away, of two components partially shown in FIG. 4.

Within wall 115 is a tube 119 the lower end of which is disposed below the lower periphery of wall 115 and, in use which projects into a well 120 in the upper end portion of cartridge 118. As will be discussed further in connection with FIG. 8, well 120 serves as the outlet from filter cartridge 118, while the inlet to that cartridge is located in its bottom end. Secured on the lower end of tube 119 is a retainer 122 through which are formed a plurality of apertures 124. A resilient sealing washer 126 is captivated by retainer 122, so as to be disposed atop apertures 124 and centered around an upstanding nipple 128 formed in retainer 122. Retainer 122 and washer 126 together constitute a check valve which passes water flow from the outlet of cartridge 118 in an upward direction but blocks the flow of water downwardly through tube 118 and that check valve.

Figure 6:
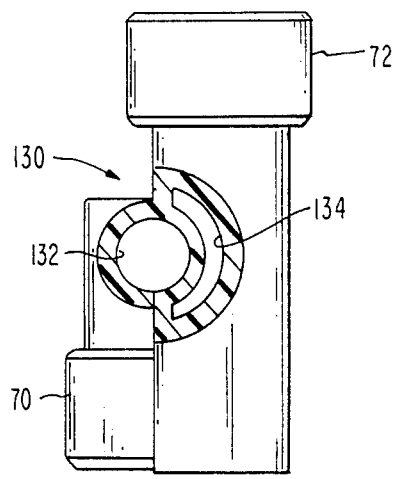
FIG. 6 is a cross-sectional view taken along the line 6—6 in FIG. 4.
Figure 7:
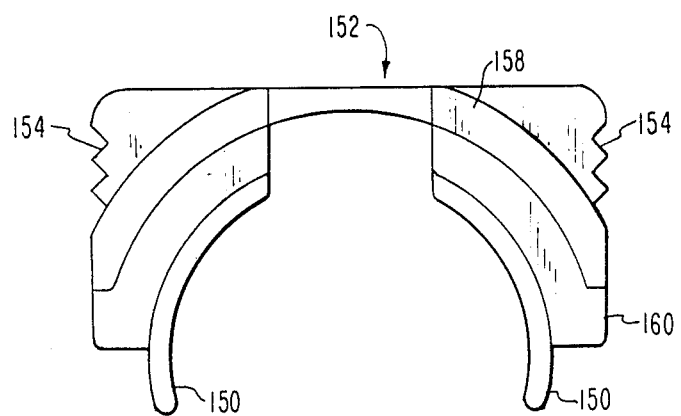
FIG. 7 is an enlarged front elevational view of a component shown in FIG. 4.

Input port 70 and output port 72 are mounted upon the outer end portion of a conduit assembly 130. As illustrated, those ports are formed integrally with that conduit assembly. Assembly 130 includes a first conduit 132 which leads from input port 70 and a second conduit 134 which leads from output port 72. As can be seen in FIG. 6, conduit 134 partially encircles conduit 132. The end of assembly 130 opposite ports 70 and 72 includes a continuation of conduit 132 concentrically surrounded integrally by a spaced plug 136 around which are formed a plurality of ribs 137, 138, 139 and 140. The external diameters of ribs 137-140 increase in respective succession to match the degree of taper in cavity 106. An O-ring 142 is seated between ribs 137 and 138, so as to seal with the wall of cavity 106 when plug 136 is inserted to a position near the bottom of cavity 106. A space 144 between conduit 132 and plug 136 opens through a wall 146 into outer conduit 134. Cut through the upper wall of cavity 106 on either side of its center line are a pair of slots 148 through which may project a corresponding pair of legs 150 which project downwardly from a handle 152 as best seen in FIG. 7. Handle 152 includes a finger grip 154 on either side and a a wide band 158 joined to legs 150 by a web 160.

A seal washer 162 is disposed in the bottom of cavity 106. With plug 136 inserted within cavity 106, the lower extremities of legs 150 are seated against the side of rib 139 that faces the opening in cavity 106 to hold plug 136 within cavity 106. In that position, nubs 163 on the respective lower ends of legs 150 lock the legs in place within slots 148. With legs 150 so captivated, the inner end of conduit 132 is pressed into seal washer 162. Conduit assembly 130 must be forceably pushed still further inwardly of cavity 106 before legs 150 can be withdrawn to permit removal of plug 136 from the cavity. Similarly, when plug 136 is inserted in cavity 106, it is necessary to press forcefully upon conduit assembly 130 in order to be able to lock legs 150 in place against rib 139.

With conduit assembly 130 in place, the seals established by O-ring 142 and seal washer 162 are sufficiently tight to prevent leakage therearound, while yet allowing canister 66 and cap 68 to be swung around axis 164 of conduit 132. That permits canister 66 to have a vertical orientation even though input port 70 and output port 72 may need to be canted away from the vertical in order to accomodate connection into a water line which runs in other than a vertical direction. Were canister 66 to be positioned with other than vertical orientation, water retained within canister 66 when the water delivery is turned off, to enable removing the canister from cap 68 in order to change cartridge 118, would be likely to spill onto the the floor of cabinet 52.

Also for the purpose of guarding against such spillage, lip 166 of canister 66 projects above the threads at 110 and above the bottom of cap 68 at the inner top of its flange 108. When water delivery is shut off, water remains in the annular space between cartrige 118 and canister 66 up to about the inner top of flange 108. The distance which lip 166 projects upwardly with respect to the upper inner end of flange 108 is sufficient that, whatever volume or quantity so remains in the upper portion of canister 66 under those conditions, canister 66 may be removed from cap 68 without the water level therewithin being so high as to cause overflow. In that situation, the check valve formed by retainer 122 and washer 126 prevents discharge of any water remaining within tube 119.

Continuing on into the interior of cap 68 from cavity 106 is a bore 170 closed at its inner end. Seated within that inner end is the head 172 of a post 174 which carries a plurality of circumferentially spaced flutes 176. Surrounding flutes 176 is a compression spring 178. Spring 178 is compressed between the underside of head 172 and the inner side of the head 180 of a piston 182 which is slideable within bore 170 against the force of spring 178. Circling the outer wall of piston 182 are a spaced pair of ribs 184 and 186 between which is seated a flat resilient sealing washer 188. Washer 188 is mounted in a stretched condition, as a result of which it cants upwardly within the groove defined between ribs 184 and 186. When piston 182 slides inwardly within bore 170, that cant insures the creation of a tight seal, while yet allowing the piston to slide easily and quickly within the bore and not requiring narrow tolerances.

An aperture 190 in the center of head 180 is aligned with the hole in washer 162 on axis 164 upon which post 174 also is aligned. Formed in the wall of bore 170 near its inner end is an opening 192 which leads to an exit port 194 that communicates into the space surrounding cartridge 118. Another opening 196 in the wall of bore 170 near seal washer 162 leads into tube 119.

Piston 182 and its associated components together with seal washer 162 constitute a diverter which controls flow through the interior of cap 68 as amongst several different paths. As indicated by appropriate arrows, a flow passage 200 begins at input port 70 and continues through conduit 132, the hole in seal washer 162, aperture 190 in head 180, the interior of piston 182 and outlet 192 to exit port 194 which is in communication with the inlet of cartridge 118.

A gap 202 formed in the interior of cap 68 leads from the space within tube 119 into space 144 which surrounds conduit 132. The lower end of tube 119 constitutes an entrance port at which the check valve formed by retainer 122 and seal washer 126 is located. Water arriving from the outlet 120 of cartridge 118 may pass through that check valve and continue in a channel 204 through gap 202 into space 144 and on through conduit 134 to output port 72.

With piston 182 in its position engaged with seal washer 162, therefore, opening 192 is uncovered so that both passage 200 and channel 204 are opened to permit water arriving at input port 70 to traverse the unit and the interior of filter cartridge 118 with the water eventually going out of output port 72. At this time, opening 196 is closed by seal washer 188 and the engagement of head 180 with seal washer 162. This, then, represents the filter mode of operation and is a first condition of operation.

A second condition of operation results in a bypass mode when piston 182 is moved to its position as illustrated in FIG. 9. In this condition, piston 182 is positioned with its rear end abutting or approaching the underside of head 172. That movement serves effectively to close opening 192. At the same time, opening 196 is exposed or opened by the withdrawal of piston 182 away from seal washer 162. A passageway 206 thereupon is formed to lead from input port 70 through conduit 132 and the hole in seal washer 162 down through opening 196 and continuing through gap 202, space 144 and conduit 134 to output port 72. Thus, passageway 206 is opened and both passage 200 and channel 204 are closed. It will be noted that portions of passage 200 and passageway 206 are in common.

It is not necessary that the movement of piston 182 to the position of FIG. 9 creates an actual physical closure of opening 192. The impedance to water flow presented by cartridge 118 is sufficient to preclude flow out of exit port 194 when opening 196 is uncovered to enable flow in passageway 206 in bypass of the cartridge.

Spring 178 is calibrated in strength to exert a force upon the inner side of head 180 to engage piston 182 with seal washer 162 at any time that the rate of water flow through faucet 58 is less than a predetermined amount. For the standard filter cartridges available on the market, that predetermined amount preferably is a flow rate of about one gallon per minute. At that rate, the filtering capacity of cartridge 118 is sufficient to allow it to have a reasonable length of effective life. At the same time, the rate of flow is small enough to insure a sufficient length of time and contact of the water being filtered with the filter media to achieve purification of organic contaminates in the water as well as to improve the asthetics of taste and odor of the water ultimately delivered through faucet 58.

Thus, a rate of flow of less than the predetermined amount results in the opening of passage 200 and channel 204, while closing passageway 206, establishing the filter mode of operation. On the other hand, a flow rate in excess of the predetermined amount to which spring 178 is calibrated, in this case about one gallon per minute, results in the closing of passage 200 and channel 204 and the opening of passageway 206 to establish the bypass mode of operation of the overall water filter. Increased flow rate above the threshold amount forces aperture 190 in piston 182 toward the tip of post 174. As post 174 enters aperture 190, the rate of flow through the interior of piston 182 is greatly reduced, decreasing the pressure behind head 180. At the same time, the disengagement of head 180 from seal washer 162 increases the area of head 180 impinged upon by the kinetic energy of the water flowing through conduit 132. The combination of these force changes causes piston 182 rapidly to slide from its first position of FIG. 4 to its second position of FIG. 9. It will be noted, therefore, that post 174 serves as a flow regulator in conjunction with an initial flow regulation function of the hole in seal washer 162 and that of aperture 190.

As so far discussed, therefore, the filter unit is capable of being readily and easily mounted in an existing water supply line for the purpose of either filtering or not filtering the water supply to faucet 58 as dictated by flow rate. While coupler assembly 74 permits location of the filter unit at any convenient location, the filter unit also may be mounted directly into the water line as previously mentioned. In either case, the filter unit preferrably is connected into the water line by means of pressure-type fittings. To that end, input and output ports 70 and 72 employ the use of fittings which preferably are identical to those previously discussed with the respect to coupler assembly 74. Such a fitting is shown in FIG. 4 for input port 70. A seal washer 207 is held against the end of the connecting conduit by a shoulder that projects inwardly from a nut 208 threaded onto the exterior of the conduit. Preferably, a rigid, thin washer 208a is placed between the shoulder on nut 208 and seal washer 207 to guide the latter into tight pipe engagement when nut 208 is tightened.

As illustrated, an adapter sleeve 209 is inserted within the end portion of conduit 132 and has a peripheral flange at its lower end which seats atop seal washer 207 so as to accomodate a lesser size of connecting pipe or line than otherwise would fit snugly within the outer end portion of conduit 132 itself. At least within the United States, somewhat standard flexible copper piping is used for typical sink installations in diameters of three-eights, one-half and five-eights inch sizes. The portion of of conduit 132 which constitutes input port 70 preferably is assigned an interior diameter to snugly accept a pipe size of five-eights inch and washers 207 and 208a are supplied to the user which have interior diameters selected to insure proper clamping and sealing when a pipe or line of that size is connected. On the other hand, the user preferably is supplied with washers 207 and 208a and adapters 209 having smaller interior diameters corresponding respectively to either pipe or line sizes of one-half or three-eights inch. In the same manner, such alternative washers and adapters are supplied for use with fittings 86–90 of coupling assembly 74.

In principle, the rate of water flow through faucet 58 may be varied merely by adjustment of valve 60 which controls the delivery of water to the faucet. Unfortunately, the pressure of the water supplied from municipal or private systems of water supply will vary from location to location and may vary from time to time. Accordingly, selector 42 preferably is included in the water filter combination as the control of water delivery rate. Selector 42 has a nut 210 internally threaded at 212 to be mounted upon what now are somewhat standard threads provided at the outer end of faucet 58 for the purpose of mounting an aerator. When that is not the case, a suitable adapter is used to mount selector 42 to faucets which have other kinds of threads or which may even have no threads or other mounting arrangement at all. Such adapters already are known in the art for mounting hoses or appliances such as smaller at-the-faucet filter units. A sealing washer 214 seated at the bottom of threads 212 ensures against leakage in the connection of nut 210 either directly to the faucet or to such an adapter.

Seated within the hollow interior of nut 210 is a carrier 216. Projecting outwardly from the body of nut 210 is a semi-circular lip 218. Carrier 216 has a flange 220 from which a semi-circular lip 222 projects toward nut 210 so that, when carrier 216 is assembled to nut 210, the coaction between lips 218 and 222 key or lock those two parts together as against rotation of carrier 216. A hollow cylinder 224 constitutes the main portion of carrier 216 and includes a pair of space-opposed recesses 226 which communicate with space-opposed arcuate apertures 228 formed in flange 220. A central passage 230 is formed in flange 220 and leads through the interior of cylinder 224.

Figure 11:
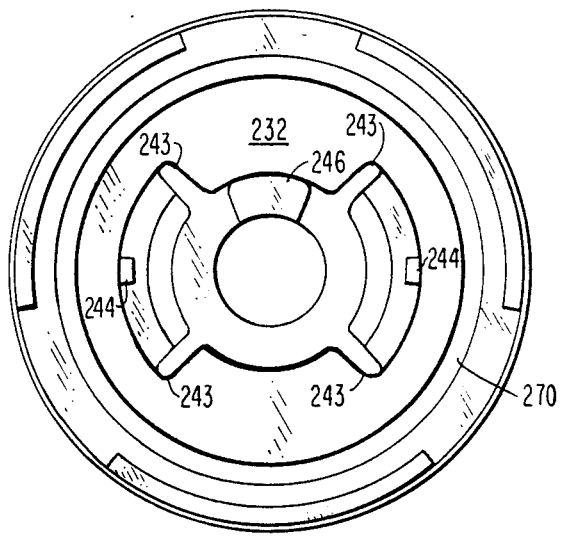
FIG. 11 is a plan view of two components shown in FIG. 10 as reversed in orientation and assembled.
Figure 10:
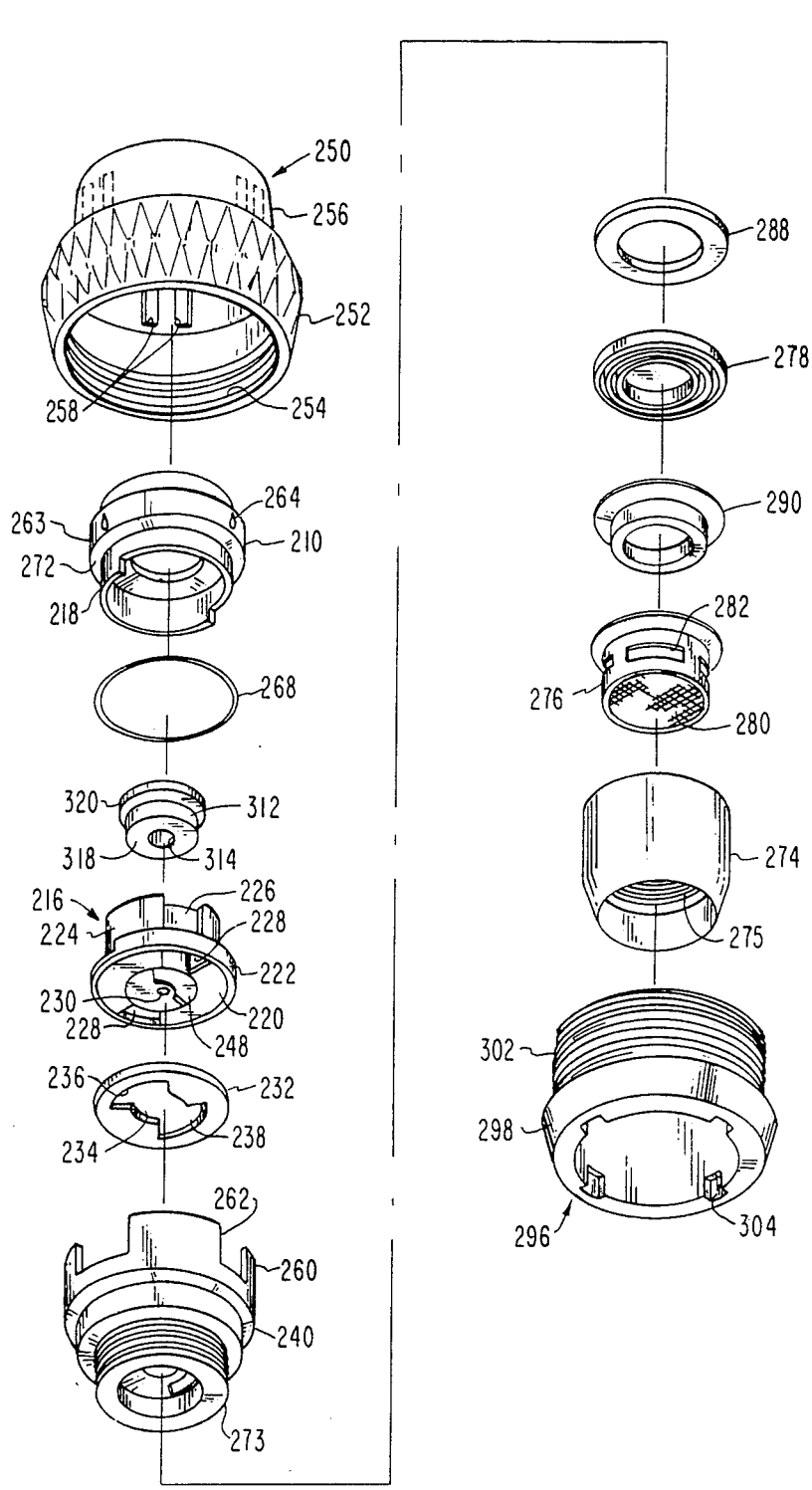
FIG. 10 is an exploded isometric view of a water selector used in the combination of FIG. 1.

Next beyond carrier 216 is a seal selector 232 which has a central port 234 that enlarges into space-opposed arcuate ports 236 and 238 which flank port 234. Seal selector 232 adjoins a main body 240 that has a central channel 241 which expands into a region 242. As best seen in FIG. 11, seal selector 232 seats around a plurality of upstanding ribs 243 respective pairs of which protrude through ports 236 and 238 in the seal selector. A respective pair of tabs 244 on body 240 assist in maintaining alignment of seal selector 232 properly in place. A lug 246 seats within a corresponding arcuate well 248 formed into flange 220 of carrier 216. Thus, seal selector 232 is held in place to body 240 for rotation therewith and body 240 can rotate only a limited distance relative to carrier 216 by reason of the protrusion of lug 246 within well 248.

Enveloping nut 210, carrier 216, seal selector 232 and body 240 is a control ring 250. Control ring 250 includes an externally fluted cylinder 252 internally threaded at 254 and from which integrally and upwardly projects a snout 256. Circumferentially equal spaced around the interior of snout 256 are a plurality of pairs of ribs 258. Projecting toward snout 256 from body 240 is a circular rim 260 in which is formed a circumferentially-spaced plurality of cut-outs 262 which, upon assembly, seat astride ribs 258 and key or lock control ring 250 to body 240 in rotation.

Formed on the exterior of nut 210 is a ridge 263 which seats into snout 256. The upper end of snout 256 continues inwardly into a circular retainer that captivates control ring 250 about ridge 263 on nut 210. Disposed upon the outer surface of ridge 263 are a circumferentially equal spaced series of indicia 264 herein of a teardrop shape. When control ring 250 is rotated so that indicia 264 are positioned between the respective ones of each pair of ribs 258, indicia 264 are visable between the ribs through the wall of snout 256 which is transparent. On the other hand, when control ring 250 and body 240 are rotated around the central axis 265 of selector 42, the solid portions of rim 260 mask indicia 264, so that they cannot be seen from outside the assembly. In an alternative wherein snout 256 is other than transparent, actual windows may be formed through the wall of snout 256. Also, indicia 264 may be located on either nut 210 or carrier 216, so long as they are visible through an effective or actual window.

Upon assembly of the components thus far described, an O-ring 268 seats within a recess 270, formed into the inner cross-wall of body 240 as shown in FIG. 11, and fits against the side 272 of ridge 263 on nut 210. As so assembled, it will be observed that the respective different sets of parts are keyed together in a manner which assures proper alignment of the different flow paths about which more is said subsequently.

Fixed below body 240 is a conventional aerator assembly secured to a nipple 273 threaded upon its exterior to mate with standard aerator assemblies. As such, the aerator is strictly optional, but one is illustrated and described herein for the purpose of desired completeness. Accordingly, a shroud 274 threaded at 275 to mate with nipple 273 surrounds a basket 276 which in turn is assembled to a barrier 278. A mesh 280 covers the exit from basket 276. Ports 282 in basket 276 enable air to be mixed with water flowing along a path 284 from region 242 through ports 286 in the side wall of barrier 278. When assembled to nipple 273, a seal washer 288 is seated between the nipple and barrier 278. A sleeve 290 mounts basket 276 to barrier 278.

Holding everything together when assembled is an identification ring 296. It includes a band 298 which terminates downwardly in a ledge 300, so as to accomodate the mounting of a decal or the like which may carry a trademark, a tradename or other indications. Projecting upwardly from band 298 is a threaded cylinder 302. The threads on cylinder 302 match threads 254 in the interior of control ring 250. A plurality of circumferencially-spaced recesses 304 within ring 296 serve to accept an appropriately constructed tool for tightening or untightening ring 296 with respect to ring 250 in order to assemble or disassemble the overall assembly.

Disposed within an interior well in carrier 216 is a flow control collar 312 in alignment with axis 265. Collar 312 has a central opening 314 and a flat upstream face 316. Its downstream face 318 tapers upwardly toward opening 314. A flange 320 seats into a recess 322 formed into the interior upper end portion of carrier 216 in order to position collar 312 and ensure that, during assembly, it cannot be implaced backwardly.

Figure 12:
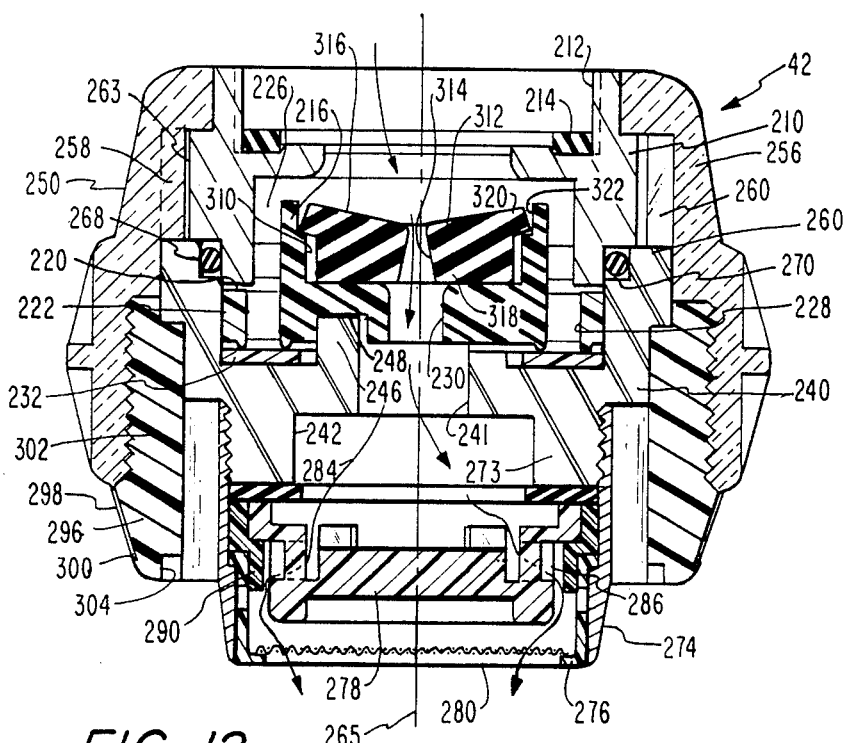
FIG. 12 is an enlarged centrally-taken cross-sectional view of the selector of FIG. 10 as assembled.
Figure 13:
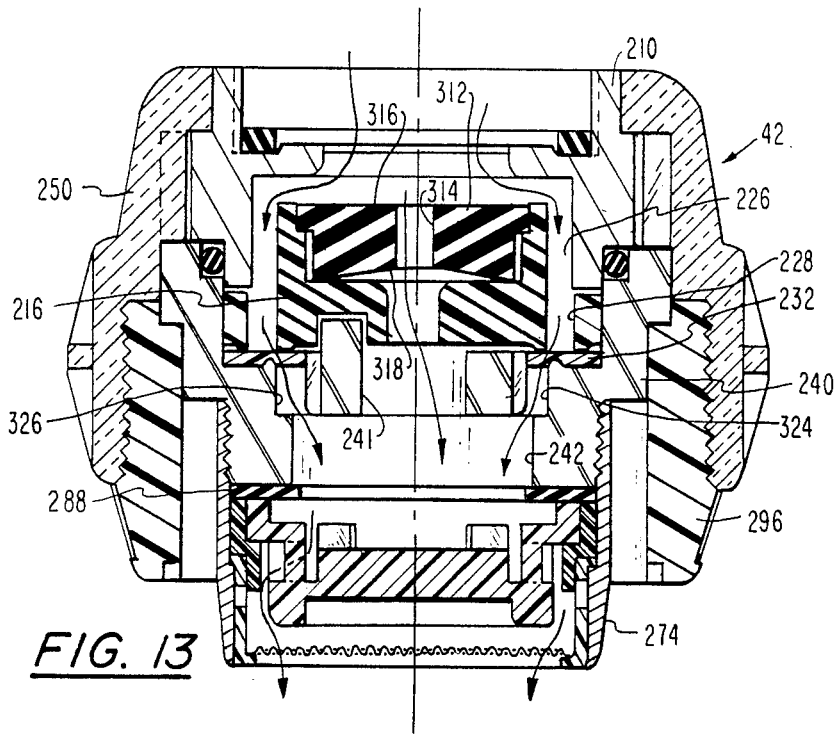
FIG. 13 is a view similar to FIG. 12 but with certain of the components in a different position.

When water is delivered from faucet 58 into selector 42, it impinges upon face 316 of collar 312. As the delivered pressure of that water increases, collar 312 is deformed downwardly as allowed by its lower face 318. In turn, that defomation distorts the wall of opening 314 so as to constrict the interior diameter of collar 312 by an amount proportional to the increase in pressure. Thus, collar 312 serves as a flow regulator. In the embodiment herein presented, it has been found that the characteristics of collar 312 are such as to maintain the rate of flow through the opening in collar 312 substantially constant with variations in the pressure of the supplied water between about 40 and 125 pounds per square inch. FIG. 12 illustrates full deformation of collar 312, representing the highest pressure that may be regulated. In FIG. 13, however, there is no deformation of collar 312 because additional flow paths have been opened as will be further discussed.

In more detail, the degree of resiliency, dimensions and shape of collar 312 are selected such that the collar deforms to its maximum flow restriction at a flow rate of about 0.8 gallons per minute when the diverter within cap 68 switches modes at about one gallon per minute. For various water line supply pressures, that selection maintains a constant rate of flow through collar 312 when it serves as the only path of flow through selector 42. The constant rate of flow, thus, is less than the rate of flow at which the diverter in cap 68 switches out of the filter mode of operation. This differential provides a guard band that insures operation of the diverter in the filter mode whenever collar 312 has control of the flow rate. Thus, the inclusion of the guard band permits looser tolerances in the parts that determine the switching point of the diverter and the constant flow operation of collar 312. Of course, the specific flow rates mentioned are only exemplary. For a given use, they may be scaled up or down or the width of the guard band may be changed.

As will be seen in FIG. 13, body 240 includes channels 324 and 326 which communicate from seal selector 232 to region 242 of the body. Channels 324 and 326 are aligned with passages 226 in carrier 218 and ports 236 and 238 in selector seal 232 at one position of rotation of control ring 252 and body 240 relative to carrier 216. As mentioned above body 240 is rotatable about axis 265 between limit positions as created by abutment of lug 246 with the opposing ends of well 248 formed into flange 220 of carrier 216.

Accordingly, carrier 216 has central passage 230 and outer passages 226. Body 240 has central channel 241 and outer channels 324 and 326. Similarly, selector seal 232, which is sandwiched between carrier 216 and body 240, has central port 234 and outer ports 236 and 238.

In one limiting position of rotation of control ring 256 and body 240 relative to carrier 216, central passage 230, central channel 241 and port 234 are aligned to constitute a first flow path through selector 42. That same flow path also is established when body 240 and selector seal 236 are rotated to a second relative position as defined at the other limit of rotation. On the other hand, outer passages 226 in selector 216, outer channels 324 and 326 in body 240 and outer ports 236 and 238 in selector seal 232 come into alignement to constitute a second flow path through selector 42 when body 240 and control ring 250 are in that second position. However, with body 240 and control ring 250 in the first position, the outer passages, channels and ports are out of alignment so as to block flow in that second flow path.

The overall result is that when selector 42 is adjusted into its first position, only the single and central flow path is open. It is the rate of water flow through that central path to which compression spring 178 in the diverter assembly is calibrated, allowing operation in the filter mode only when that central flow path is the only one which is opened. On the other hand, when selector 42 is adjusted to the second position as above described, the second and outer flow paths are opened so as to increase the flow rate above the preselected value, at which time the diverter switches into its by-pass mode.

Accordingly, complete control of the water filter unit, located remotely and out of sight, is achieved by manipulation of selector 42. At the same time, selection of the first position, corresponding to the filtering mode, causes indicia 264 to be exposed for observation by the user. Not only does that inform the user of the mode under selection, but it serves to remind him to switch from one mode of operation to the other when that is appropriate.

Referring back to FIG. 8, it will be observed that canister 66 has a rounded bottom 330 from which downwardly projects a square nut 331 that accomodates a wrench for use in case it is necessary to apply additional force in order to start the untwisting of canister 66 from cap 68. Projecting inwardly of bottom 330 is a central tube 332 which is concentrically surrounded by a cylinder 333 of lesser height than tube 332. In the bottom of cartridge 118 is an opening 334 within which inletted water may flow through a finely porous screen 335 which covers opening 334 and prevents carbon fines, in an encased body 336 of granulated carbon material, from filtering downwardly from opening 334.

Affixed on the bottom of cartridge 118 is a tight wrapping of a fibrous material 337 that serves as a prefilter to preclude passage of particulate materials in the flow of water directed into inlet opening 334 from exit port 194. While canister 66 preferrably is transparent, an opaque band 338 surrounds canister 66 in the alignment with the upper end of material 337. The interior diameter of the sleeve of wrapped material 337 easily slips over tube 330, so as to mount cartridge 118 atop the upper end of cylinder 333.

The wall of cartridge 118 is formed by a cylinder 339 within which is contained the carbon material 336. Opening 334 is formed into the bottom wall of cylinder 339, and well 120 is formed through its upper end wall and surrounded by seal 116.

The bottom of well 120 is closed but its side wall is formed of a plurality of ribs 340 which support the well bottom from the upper periphery. Wrapped around those ribs is a post-filter 341 formed of porous fibrous material and which serves to screen out carbon fines from passage out of the interior. An impervious band 342 surrounds ribs 340 above post filter 341. The remainder of the space within cylinder 339 is entirely filled with the carbon granules.

When water arrives through exit port 194 of cap 68, it is forced through prefilter 337 and into opening 334. After travelling through the carbon granules and emerging through post filter 341 into well 120, the thereby cleansed and purified water is delivered into the entrance port of cap 68.

Circumferentially spaced around the upper end portion of canister 66 are a plurality of outwardly projecting flutes 350 which afford the user a better grasp for unthreading the canister 66 from cap 68. As illustrated, canister 66 is transparent. This permits visual observation of pre-filter 337. Over a period of use, contaminants and impurities continue to increase in density within the body of carbon particles. During the same period of time, pre-filter 337 tends to gradually absorb incoming impurities and it begins to darken. The user is instructed to replace the cartridge when pre-filter 337 becomes a dark color, because that yields an indication that the effectiveness of the carbon in achieving filtration is about to become inadequate. Band 338 emphasizes observation of the pre-filter. The time to change the cartridge also will be indicated by a reduction of flow rate when in the filtering mode. As the pre-filter and the granules become plugged with contaminants, the flow through the cartridge is restricted. Were that condition to be allowed to continue, activation of the diverter into the bypass mode may be precluded.

Various alternatives exist for the construction of selector 42. In one reversal of parts, the carrier and the flow control collar may be the movable element with respect to an affixed body. By mounting such a carrier on a worm drive, rotation of the carrier may serve to move a gate into and out of sealing relationship with flow control collar 312 so as to open and close flow through one or more outer passages which are in addition to a central passage. Instead of a gate which engages a flow control washer, a sealing ring separate from that washer may be caused, upon a worm-type rotation of the carrier, to open and close a seal against an auxiliary washer and thereby open and close a second flow path to one or more outlet channels in addition to a central flow channel. In another version of the selector, a movable part carries a central post, with movement being effective to insert and withdraw that post from within a central hole of a seal washer in order to vary the rate of water flow.

A wide variety of variations exist for the construction of cap 68. In a simple modification, input port 70 and output port 72 are in the form of conventional hose connections for coupling into the water supply line. In another version, the input and output ports may be coupled to one of several known devices which clamp onto the copper tubing and, upon the application of force by a nut, pierce the pipe to allow entry or exit of the water through the hollow interior of the piercing blade. With a piercing-type coupling serving each of the input and output ports, a constricting clamp may be placed upon the water supply pipe intermediate the two piercing fittings so as to pinch off the copper pipe at that point. Instead of having both the input port and the output port near one another and on the same side of the unit, they may be spaced on respective opposite sides of the unit, so as to provide for a connection in an in-line manner; that arrangement may facilitate connection into a water supply line of rigid pipe.

While not preferred, struts 96 in coupler assembly 74 may be eliminated, using the two channelways and their fittings as separate parts. On the other hand, struts 96 may be modified to include a pair of conduits side-by-side, so as to provide a pair of cross over paths between corresponding fittings on opposite sides. This arrangement enables the entrance fitting and the exit fitting to remain in line with one another, avoiding any necessity to flex the downstream and upstream portions of the water supply line.

Another form of coupler assembly involves a double cut of the pipe in order to remove a section and allow the insertion of a tee which has two legs. One end of the top of the tee is coupled to the downstream portion and the other end to the upstream portion. Of course, one leg then goes to the output port, while the other goes to the input port.

An alternative diverter assembly, presently believed to be the preferred mode for constructing such an assembly, is depicted in FIG. 14. Cap 68 is the same as before and includes bore 170 which continues inwardly of the cap from cavity 106. Openings 192 and 196 in the wall of bore 170, thus, also are the same as before with opening 192 leading to exit port 194 and opening 196 leading into tube 119. Overall, the operation remains the same. Thus, opening 192 forms a portion of passage 200, while opening 196 is a part of passage 206.

In this case slidable within bore 170 is a piston 360 encircled by a pair of spaced ribs 362 and 364 between which is seated a resilient flat washer 366 like washer 188 previously described. A head 368 on piston 360 includes a central aperture 370 aligned on axis 165 with a central hole 372 in a seal washer 374 that also serves to seat plug 136 of conduit assembly 130. A compression spring 376 is seated between the closed end of bore 170 and the inner face of head 368. The latter is necked down slightly with respect to the main wall of piston 360 and includes a circumferential groove 380 into which is snapped an inward flange 382 on a retainer 384 in the bottom wall of which is defined a hole 386 also aligned on axis 165.

Defined within retainer 384 is a well 388 in which is seated a resilient collar 390. As in the case of collar 310 in selector 42, collar 390 has an interior opening 392, in this case also disposed on axis 165, which continues between an upstream face 394 and a downstream face 396. Face 394 normally is flat and face 396 normally tapers inwardly of the collar toward opening 392. That shape of collar 390 causes it to reduce the interior diameter of opening 392 by an amount proportional to an increase in force of water received through seal washer 374 and impinging against face 394 of collar 390.

When the rate of flow of water through faucet 58 is less than a selected predetermined amount, in this case the same 1.0 gallons per minute previously selected, the force exerted by spring 378 is sufficient to engage retainer 384 against seal washer 374, retainer 384 thus serving as an extension of piston 360. In that condition of operation, corresponding to the filter mode, collar 390 is relaxed as shown in FIG. 14 so that the water flows by way of passage 200 through the attached filter cartridge 118 in canister 66 mounted upon flange 114 and then along channel 204.

When, however, the rate of flow through faucet 58 exceeds the threshold amount, the force exerted on face 394 deforms collar 360 so that it is distorted to a shape corresponding to that of collar 312 in FIG. 12. That deformation pinches the wall of opening 392 together at its upstream end, thereby reducing the interior diameter of collar 360 to limit the flow through aperture 370 to a constant amount. That limitation of the flow through aperture 370 allows further force exerted by the impinging water, as its flow rate increases, to move piston 360 from its position as shown in FIG. 14 to a rearward position analogous to the position of piston 182 in FIG. 9. Thus, opening 192 is closed to effectively block passage 200 and, hence, channel 204, while opening 196 is uncovered to open passageway 206 through seal washer 374. That mode of operation continues in what is the bypass mode until such time as the rate of flow of water through faucet 58 again decreases below the threshold amount at which time the compressive force with which spring 376 is calibrated again serves to move piston 360, and specifically its extension retainer 384, back into sealing engagement with seal washer 374 so as once again to open passage 200 and channel 204.

It will be observed that collar 312 in selector 42 and collar 360 of FIG. 14 are both flow regulators that operate on the same principle. However, collar 312 is used to maintain a constant flow during continuing operation after it has been deformed to a limit. In contrast, when collar 360 reaches a similar limit, the consequent movement of piston 360 to uncover opening 296 may allow collar 360 to relax. Nevertheless, until the flow rate decreases below the threshold amount, piston 360 stays in its position that uncovers opening 196, because of the pressure differential developed on the opposite sides of piston head 368.

The diverter flow control, in either embodiment, allows the attainment of an optimum flow rate through the filter. By allowing only a flow rate through the filter lower than the threshold, the amount of interaction with the carbon material can be substantially increased as compared with water filters which employ a greater rate of flow. With the faucet-mounted selector, the consumer is assured that he is obtaining filtered water. Moreover, the indicator reminds the consumer that he has filtered water when he does not need it or that he does not have it when he would desire the same. In particular, the indicator is an action reminder. Importantly, the user can have full control while working right at the sink. There is no need to stoop down to get into the sink cabinet in order to effect control or to keep the sink cabinet clear of obstacles which would impare visual observation of a control mounted on the filter unit itself. In addition, should the water supply pressure be or become less than the amount needed to cause the diverter to switch modes, the system insures that filtered water will be supplied to the user.

As compared with prior water filters designed to be mounted immediately adjacent to the sink, the substantially increased quantity of carbon material which may be contained in an under-sink model not only provides, along with the low flow rate, a greater degree of effectiveness in purification, but also provides a longer life to the cartridge by reason of the greater quantity of carbon. The reduced flow rate of the embodied filter provides substantially additional contact time with the carbon.

The use of coupler assembly 74 greatly facilitates installation of what has sometimes required several hours and, if difficult, may cost up to several hundred dollars. Installation has been reduced to a very simple task which involves only one pipe cut, whether using coupler assembly 74 or directly inserting the input and output ports into the water supply line. At most, the only additional effort required is to mount the bracket on cap 68 to a wall. As indicated above, consumer convenience is enhanced by the fact that a number of different cartridges already available on the market may be utilized with the disclosed apparatus.

While a particular embodiment of the invention has been shown and described, and a number of modifications, alternatives and variations have been presented, it will be obvious to those of ordinary skill in the art that changes and modifications may be made without departing from the invention in its broader aspects. Therefore, the aim in the appended claims is to cover all such changes and modifications as fall within the true spirit and scope of that which is patentable.

We claim:

1. A water filter unit for connection into a water line which feeds a valve-controlled faucet separate from said filter unit, said unit comprising:
   a canister;
   a filter cartridge seated within said canister with said cartridge having means defining an inlet and outlet;
   a cap to which said canister is removably attached;
   means defining an input entrance port in said cap disposed to communicate with said outlet;
   means defining an exit in said cap disposed to communicate with said inlet;
   means defining an input port in said cap for receiving water from said line;
   means defining an output in said cap for delivering water into said line to feed said faucet;
   means defining a passage in said cap communicating between said input port and said exit port;
   means defining a passageway communicating between said input port and said output port;
   means defining in said cap communicating between said entrance port and said output port;
   and a diverter in said cap responsive in a first condition to a rate of water flow from said faucet of less than a predetermined amount for opening said passage and said channel and closing said passageway and responsive in a second condition to a rate of water flow from said faucet of more than said predetermined amount for closing said passage and said channel and opening said passageway.

2. A filter unit as defined in claim 1 in which a portion of said channel and a portion of said passageway are in common, and which further includes a check valve in said channel to block water flow backwardly from said common portion through said entrance port.

3. A filter unit as defined in claim 1 wherein, with said diverter in said second condition, a predetermined volume of water may remain in the upper portion of said canister beneath said cap, in which a flange depends downwardly from said cap for engagement with said canister, and in which a lip on the upper end of said canister projects upwardly a distance sufficient to insure containment within said canister of said predetermined volume when said canister is removed downwardly from said cap.

4. A filter unit as defined in claim 1 in which said input port and said output port face in opposite directions and are sufficiently in alignment laterally with the respect to said directions to enable a single cut of said water line to permit coupling of said input and output ports into said water line.

5. A filter unit as defined in claim 1 in which said input port and said output port each have a predetermined interior diameter and each includes a nut for sealingly engaging the port to a respective water pipe and which further includes a pair of adapter sleeves individually inserted in respective ones of said input and output ports and having interior diameters less than said predetermined diameter and being locked in place upon engagement of the said respective nut.

6. A filter unit as defined in claim 1 in which said input and output ports are mounted upon one end portion of a conduit assembly the other end portion of which is sealingly engaged removably with said cap.

7. A filter unit as defined in claim 6 in which said conduit assembly includes a first conduit leading from said input port and constituting a portion of each of said passage and said passageway and a second conduit leading to said output port and constituting a portion of each of said channel and said passageway.

8. A filter unit as defined in claim 7 in which said second conduit partially encircles said first conduit.

9. A filter unit as defined in claim 6 in which said cap defines a cavity within which said other end portion of said conduit assembly is received and means for removably locking said assembly in said conduit.

10. A filter unit as defined in claim 9 in which, with said assembly locked into said cavity, said cap and canister are free to swing about the longitudinal axis of said assembly while maintaining a seal between said cap and said assembly.

11. A water filter system for connection into a water line which feeds a valve-controlled faucet located remotely from a water filter and comprising:
a housing;
means defining an input port in said housing for receiving water from said line;
means defining an output port in said housing for delivering water into said line to feed said faucet;
a filter element disposed within said housing;
means defining a passageway for delivering water directly from said input port to said output port in bypass of said filter element;
means defining a pathway for delivering water from said input port through said filter element to said output port;
valving means located within said housing responsive to a rate of water flow less than a predetermined amount for delivering water along said pathway and responsive to a rate of water flow or more than said predetermined amount for delivering water along said passageway;
and a selector mounted to receive water from said faucet and adjustable between a first position that establishes a rate of water flow less than said predetermined amount and a second position that establishes a rate of water flow above said predetermined amount.

12. A filter unit as defined in claim 1 in which said cap defines a bore closed at one end and within which said diverter is disposed and in which said diverter includes:
a seal washer disposed across the other end of said bore, a portion of each of said passage and passageway including a hole in said seal washer;
a hollow piston slidable within said bore into and out of engagement with said seal washer, means defining an aperture in the head of said piston constituting a portion of said passage;
means defining a first opening in the wall of said bore constituting a portion of said passageway and means defining and a second opening in the wall of said bore constituting a portion of said passage, said piston opening said first opening and closing said second opening when moved to a first position out of engagement with said seal washer and closing said first opening and opening said second opening when moved to a second position and into engagement with said seal washer;
and a compression spring disposed within said piston and having a strength to engage said piston with said seal washer when said rate is less than said predetermined amount and to allow said piston to move out of engagement with said seal washer when said rate is more than said predetermined amount.

13. A filter unit as defined in claim 12 which includes a post seated in said bore and projecting within said spring and said piston in alignment with said aperture, the tip of said post being spaced beyond said head from said seal washer when said piston is in a first position engaged therewith but said tip entering said aperture upon initial disengagement of said piston from said seal washer and therby substantially reducing flow through said aperture to enable increased forces on said piston to cause rapid movement of said piston from said second position to said first position.

14. A filter unit as defined in claim 12 which includes flow regulating means for substantially reducing flow through said aperture to enable rapid movement of said piston from said second position to said first position when said rate exceeds said predetermined amount.

15. A filter unit as defined in claim 14 in which said regulating means includes a resilient collar affixed to said piston between said head and said seal washer and through which flows water in said passage, said collar being shaped to reduce its interior diameter by an amount proportional to an increase in force of water received through said seal washer and impinging against the face of said collar, said collar when constricted reaching a limit that effects movement of said piston to said first postion.

16. A filter unit as defined in claim 15 in which said collar reduces its interior diameter to thereby decrease flow through said aperture and enable increased force of incoming flow to cause rapid movement of said piston from said second position to said first position when said rate exceeds said predetermined amount.

17. A filter unit as defined in claim 1 which further includes a selector mounted to receive water directly from said faucet and adjustable between a first position wherein said rate is less than said predetermined amount and a second position in which said rate is above said predetermined amount.

18. A filter unit as defined in claim 17 in which said selector further includes a resilient collar through which all water delivered flows when said selector is in said first position, said collar being shaped to reduce its interior diameter by an amount proportional to an increase in force of water received from said faucet and to maintain constant flow therethrough when said selector is in said first position.

19. A filter unit as defined in claim 18 in which said collar is formed to include means facilitating its seating within said selector in only one orientation.

20. A filter unit as defined in claim 17 in which adjustment of said selector to said first postion establishes a rate of flow significantly differentiated from the rate of flow when said diverter is in said second condition.

21. A filter unit as defined in claim 17 in which said selector includes a plurality of parts and in which said parts individually include keying means for enabling assembly of said parts together in only a preselected orientation.

22. A filter unit as defined in claim 17 in which said selector includes a part movable to adjust said selector between said first and second positions, and in which said part includes an indicia movable with said part between first and second locations corresponding to said first and second positions to indicate the one of said positions selected.

23. A filter unit as defined in claim 17 in which said selector includes:

a carrier coupled to said faucet and having at least means defining a first passage and a second passage therethrough;

a body mounted to move between first and second positions corresponding to said first and second conditions, respectively, and having at least means defining a first channel and a second channel therethrough;

a selector seal sandwiched between said carrier and said body with said selector seal having at least means defining first and second ports therethrough;

said first passage, said first channel and said first port together being in alignment to constitute a first flow path through said selector in both said first and second positions of said body;

and said second passage, said second channel and said second channel together being alignable to constitute a second flow path through said selector in said second postion of said body but, with said body being in said first postion, being out of alignment to block said second flow path.

24. A filter unit as defined in claim 23 which further includes a control ring surrounding and to which said body is fixed with said control ring including a window, and an indicia fixed in position with respect to said carrier and visible through said window when said body is in said first position but not visible through said window when said body is in said second position.

25. A filter unit as defined in claim 23 in which a resilient collar is seated in said carrier in alignment with said first flow path, said collar being shaped to reduce its interior diameter by an amount proportional to an increase in force of water in said first flow path and to maintain constant flow therethrough when said selector is in said first position.

26. A filter unit as defined in claim 23 which further includes a nut engageable with said faucet and in which said carrier is interlocked with said nut.

27. A filter unit as defined in claim 1 which further includes a coupling assembly having an entrance fitting, an outlet fitting, an inlet fitting and an exit fitting;

in which means defining a first channelway within said assembly communicates between said entrance fitting and said outlet fitting;

in which means defining a second channelway within said assembly communicates between said inlet fittig and said exit fitting;

in which an upstream end of said water line is coupled to said entrance fitting and a downstream end of said water line is coupled to said exit fitting;

and which further includes a first pipe coupled between said outlet fitting and said input port and a second pipe coupled between said output port and said inlet fitting.

28. A filter unit as defined in claim 27 which includes means for rigidly interconnecting said first and second channelways.

29. A filter unit as defined in claim 1 which further includes a selector mounted to receive water directly from said faucet;

means defining first and second flow paths through said selector;

and means rotatable to a first position to select only said first flow path in correspondence with said first condition and rotatable to a second position to select both of said first and said flow paths in correspondence with said second condition.

30. A filter unit as defined in claim 1 which further includes a coupling assembly connectable into said water line and having an outlet fitting and an inlet fitting;

a first pipe coupled between said outlet fitting and said output port and a second pipe coupled between said output and said inlet fitting;

means defining a first channelway in said coupling assembly between an upstream portion of said water line and said outlet fitting;

means defining a second channelway in said coupling assembly between a downstream portion of said water line and said inlet fitting;

said downstream portion being effectively separated from said upstream portion by said coupling assembly to prevent direct flow therebetween.

31. For us in connecting a water filter into a water line, a coupling assembly comprising:

an entrance pipe fitting, an outlet pipe fitting, an inlet pipe fitting and an exit pipe fitting;

means definig a first channelway within said assembly communicating only between said entrance fitting and said outlet fitting;

means defining a second channelway within said assembly communicating only between said inlet fitting and said exit fitting;

and means for rigidly interconnecting said first and second channelways.

32. A water flow selector comprising:

a carrier fixedly coupled to a source of water and having at least means defining a first passage and a second passage therethrough;

a body mounted to move between first and second positions and having at least a first channel and a second channel therethrough;

a selector seal sandwiched between said carrier and said body with said selector seal having at least means defining first and second ports therethrough;

said first passage, said first channel and said first port together being in alignment to constitute a first flow path through said selector in both said first and second positions of said body;

and said second passage, said second channel and said second port together being alignable to constitute a second flow path through said selector in said second position of said body but, with said body being in said first position, being out of alignment to block said second flow path.

33. A selector as defined in claim 32 which further includes a control ring surrounding and to which said body is fixed with said control ring including a window, and an indicia fixed in position with respect to said carrier and visible through said window when said body is in said first position but not visible through said window when said body is in said second position.

34. A selector as defined in claim 32 in which a resilient collar is seated in said carrier in alignment with said first flow path, said collar being shaped to reduce its interior diameter by an amount proportional to an increase in pressure of water in said first flow path and limiting the rate of flow when above a predetermined amount.

35. A selector as defined in claim 32 which further includes a nut engagable with said source and in which said carrier is interlocked with said nut.

36. A water conveying system comprising:

a water flow device having means defining an input and an output port;

a water line for delivering water from a source of water to a water receiving location, said water line having an upstream portion and a downstream portion;

a coupling system having an entrance fitting, an outlet fitting an inlet fitting and an exit fitting;

means defining a first channelway within said assembly communicating only between said entrance fitting and said outlet fitting;

means defining a second channelway within said assembly communicating only between said inlet fitting and said exit fitting;

an upstream end of said water line being coupled to said entrance fitting and a downstream end of said water line being coupled to said exit fitting;

and a first pipe coupled between said outlet fitting and said input port and a second pipe coupled between said output port and said inlet fitting.

37. A water conveying system as defined in claim 36 in which said input and output ports face in opposite directions and in which said input and output ports are sufficiently in alignment laterally with respect to said directions to enable a single cut of said water line to permit coupling of said input and output ports into said water line.

* * * * *